United States Patent [19]

Herron

[11] Patent Number: 6,019,805
[45] Date of Patent: Feb. 1, 2000

[54] ABRASIVE FILAMENTS IN COATED ABRASIVES

[75] Inventor: Ralph Herron, Ballston, N.Y.

[73] Assignee: Norton Company, Worcester, Mass.

[21] Appl. No.: 09/071,476

[22] Filed: May 1, 1998

[51] Int. Cl.[7] .............................. B24D 3/00; B24D 17/00; B24D 18/00
[52] U.S. Cl. ................................. 51/295; 51/293; 51/309
[58] Field of Search .............................. 51/295, 293, 307, 51/309

[56] References Cited

U.S. PATENT DOCUMENTS

| 4,133,147 | 1/1979 | Swift, Jr. ..................... 51/295 |
| 5,185,012 | 2/1993 | Kelly et al. .................. 51/295 |
| 5,244,477 | 9/1993 | Rue et al. .................... 51/309 |

*Primary Examiner*—Michael Marcheschi
*Attorney, Agent, or Firm*—David Bennett

[57] ABSTRACT

A coated abrasive material comprising a substrate and maker coat and adhered by means of the maker coat a plurality of abrasive grits in the form of U-shaped particles or coils.

9 Claims, No Drawings

ABRASIVE FILAMENTS IN COATED ABRASIVES

BACKGROUND OF THE INVENTION

The present invention relates to coated abrasives and particularly to coated abrasives comprising specific forms of abrasive particles.

Coated abrasives of the conventional kind comprise a backing material and, adhered to the backing material, a maker coat which serves to anchor abrasive grits deposited on the maker coat while it is still in an uncured state. The maker coat is the initial bond between the grit and the backing but the primary means by which the grit is held in position while the coated abrasive is actually in use is a size coat that is applied over the tops of the abrasive grits.

With conventional randomly shaped grits the depth of the size coat and therefore the volume and cost of such coats is relatively modest. If however the grits become more elongated and are aligned preferentially perpendicular to the backing surface, the conventional amount of size would be located adjacent an extremity of the grit with the balance projecting above. When used for grinding, a force is in effect applied to the grits in contact with the surface being ground in the direction of relative movement of the workpiece with respect to the grit. The longer the grit the greater the moment of that force and the more likely the grit is to fracture above the size level or even be torn out of the size layer altogether. One solution to this problem is to add a deeper size layer but this becomes expensive. Another is to incorporate filler materials to the size such that, with the same volume of binder component in the size, the actual volume of the size formulation is increased by the volume of filler added. This does however have the effect of reducing the strength of the bond between the grit and the binder such the grits might more easily torn out during grinding.

Nevertheless there is considerable advantage to be gained from providing elongated abrasive grains oriented perpendicular to the backing if these can be adequately anchored to the backing because, if they wear down in a controlled fashion and do not become dulled, the useful life of the coated abrasive can be significantly extended.

Elongated grits however have a potential problem in that when deposited on a conventional maker coat by the conventional electrostatic precipitation technique, (called the UP process), they stand on end being held only at their extremity by the maker coat. This posture is relatively easily disturbed by flexing the substrate or by passing the coated material through a roller nip or even by the use of a knife coater to apply the size coat. Therefore the maintenance of the orientation of the grits on the backing during further manufacturing stages becomes a matter of some difficulty.

Abrasive grits with a highly elongated shape are described for example in U.S. Pat. Nos. 5,009,676; 5,103,598; 5,090968; and 5,244,477. Such grits usually have a uniform cross-sectional shape and have an aspect ratio, (the ratio of the longest dimension to the greatest dimension perpendicular to the longest dimension), of greater than 1 and more usually at least 2:1 and frequently from 4:1 to 25:1 or more. Such grits are typically made from a sol-gel alumina and more suitably from a seeded sol-gel alumina. These aluminas comprise sub-micron crystals of alpha alumina and during grinding these break off in controlled fashion exposing fresh cutting surfaces. Such grits therefore show excellent grinding performance.

It is therefore highly desirable to develop ways in which these sol-gel alumina grits can be used to the greatest advantage. This in practice resolves itself into ways of producing an abrasive product in which elongated abrasive grits are oriented so as to present grit ends at the cutting surface of the coated abrasive.

The present invention provides such a product and a process for obtaining such a product. The grits are held very strongly and the orientation can be made essentially constant.

GENERAL DESCRIPTION OF THE INVENTION

The present invention provides a coated abrasive comprising a plurality of filamentary abrasive grits adhered to a backing material, the grits having an essentially U-shape with the open ends oriented away from the backing.

The invention also provides a coated abrasive which comprises a backing material and a plurality of filamentary abrasive grits in the form of loose coils adhered to the backing by a cured binder material with the axes of the coils parallel to the backing material surface.

The invention further provides a process for the production of a coated abrasive comprising a plurality of filamentary abrasive grits which comprises:

a) providing a backing material bearing a layer of an uncured binder material;

b) depositing a plurality of filamentary abrasive grits in the form of coils on to the binder layer with the axes of the coils parallel to a major surface of the backing material in such a fashion that the grits become at least partially submerged in the binder layer;

c) curing the binder layer; and d) subjecting the resulting coated abrasive to a dressing operation in which the surface layer is cut away until the portions of the abrasive coils furthest from the backing are exposed and removed, leaving two end pieces for each turn of each coil that is cut away.

It is obviously preferable that the coiled filamentary abrasive grits have closely similar radii so as to ensure that the amount of dressing required is minimized.

SPECIFIC DESCRIPTION OF THE INVENTION

In the products according to the invention the filamentary abrasive grits that remain after the dressing operation have an essentially U-shape. This is however not to be taken too literally since the benefits of the invention can be secured by any shape that involves a uniformly crimped structure. In the preferred process of the invention, the U-shape is generated by depositing coiled filamentary grits on a backing with the axes parallel to the backing and subsequently dressing away the portion of the coil furthest removed from the backing. This leaves a residue of the coil in the form of a plurality of U-shapes. If the coil is very tight with the successive turns of the coil in contact, the uprights of the U-shape will be approximately parallel. It is however understood that the term "U-shaped" is also intended to cover the situation in which the uprights of the "U-shape" are far from parallel as would be the case if the coil were quite loose and the successive turns of the coil were not in contact with adjacent turns. A "U-shaped" product would be the consequence of forming the coil around a cylindrical mandrel but even if the mandrel had an elliptical, square, triangular or other polygonal cross-section, it is understood that the shape of the filamentary abrasive particles after the dressing process could still be described as "essentially U-shaped" for the purposes of this invention.

The coated abrasives of the invention can have the U-shaped filamentary abrasive grits arranged in patterns or be essentially randomly distributed. If the shapes are derived from dressed-down coils at least some groups will have common orientations. In such case also the maximum density of grits will be secured when all the original coils are likewise similarly aligned with parallel axes.

Coiled filamentary abrasive grits are readily obtained by a simple modification of an extrusion process in which a sol-gel alumina is extruded in the form of a continuous filament with a cross-section determined by the die orifice and then taking up the filament on a rotating rod or mandrel to form a coil. The coil is then be subjected to a drying and firing operation resulting in a coiled filamentary abrasive particle. This is then broken into suitable lengths for incorporation into a coated abrasive. Alternatively the extrusion is regulated to produce the extrudate in discrete lengths such that no subsequent breaking operation is required.

The preferred material from which the U-shaped filamentary abrasive grits are made is a sol-gel alumina and particularly a seeded sol-gel alumina because of the ready adaptability of such materials to the production of the filamentary abrasive grits in coiled form. Suitable sol-gel aluminas are formed from a boehmite gel which has been peptized for example by addition of an acid before being extruded, dried, and fired to the alpha alumina form. The most preferred form is however seeded with a material effective to reduce the temperature of conversion to the alpha form and to generate the alpha alumina as sub-micron sized crystals. Suitable seeds include alpha alumina and other finely divided materials with the same crystal morphology as alpha alumina and lattice dimensions that are as close as possible to those of alpha alumina. The sol-gel alumina can also comprise modifying components including crystal growth limiters and crystal boundary modifiers. Suitable materials include spinel formers such as magnesia, rare earth metal oxides and transition metal oxides.

In a preferred form of the invention the coils of abrasive filaments, as added in the production of the coated abrasive, are coiled around a composition comprising a grinding adjuvant such as for example a grinding aid, lubricant, anti-loading additive, anti-static additive or any other suitable adjuvant for the grinding operation wherein it is most advantageous that the adjuvant is located for maximum effectiveness close to the point at which the abrasive contacts the work piece. This composition may be a dispersion of the additive in a suitable binder or even in a solid lubricant and in addition to the space within the coils, it can occupy any space between the turns of the coils.

The backing material of the coated abrasive can be any of those conventionally used including polymeric films; paper; woven, knit or stitched-bonded cloth fabrics; and the like. The backing can receive conventional presize and front or back fill treatments before receiving a coating of a maker coat.

The novel self-orienting nature of the elongated filamentary abrasive grits allows the use of a totally novel process for the production of the coated abrasive as described above. Rather than using the usual succession of maker, size and optional supersize coats, the coated abrasive can be produced in a single operation of great simplicity. Conventional process steps can however be used if desired.

In the preferred process a relatively thick layer of binder material is laid down on a substrate and the coiled filamentary abrasive grits are laid on the layer and preferably rolled into the layer till they become at least partially, and preferably substantially completely, submerged in the uncured binder material. This eliminates the traditional UP coating process by which abrasive grits are normally applied thereby introducing a further degree of simplification to the production process. An alternative is to apply the coiled filamentary abrasive grits to the backing and apply the binder layer over the grits. This could however raise certain technical difficulties in ensuring adequate penetration of the binder through the coils and into contact with the backing material. Inadequate adhesion to the backing can result in premature failure of the coated abrasive product by shedding of the abrasive during use. However if such problems can be overcome and it is feasible to apply the binder over the coiled filamentary abrasive grits, it is preferred that the backing material receive a thin coating of a pressure sensitive adhesive to hold them in position while the binder later is applied.

The binder layer or, if traditional production processes are used, the maker and size coats, can be any of those known to the skilled man in the art. These include phenolic resins, UF resins, melamine/formaldehyde resins, epoxy resins, and radiation-curable resins such as epoxy-acrylates, acrylated urethanes and acrylate esters.

A supersize coat can also be applied to the product, whether made by the novel process of the invention or by the more traditional route, in conventional fashion to place grinding aids on the surface. Other conventional additives such as fillers, porosity inducers, anti-static additives, lubricants and the like can be incorporated into either or both of the size and supersize coats.

Alternatively and often preferably, a grinding aid or other additive commonly added in a supersize coat can in fact be added in the binder layer or to the size coat, thereby eliminating the need for a separate supersize application operation.

What is claimed is:

1. A coated abrasive comprising a plurality of filamentary abrasive grits adhered to a backing material, the grits having an essentially U-shape with the open ends oriented away from the backing.

2. A coated abrasive according to claim 1 in which the filamentary abrasive grits are formed from a sol-gel alumina.

3. A coated abrasive according to claim 1 in which the filamentary abrasive grits are formed from a seeded sol-gel alumina.

4. A coated abrasive comprising a backing material and, adhered thereto, a plurality of filamentary abrasive grits each being coiled about an axis and aligned with the axes of the coils parallel to a major surface of the backing material.

5. A process for the production of a coated abrasive comprising:
   a) providing a backing material bearing a layer of an uncured binder material;
   b) depositing a plurality of filamentary abrasive grits each being coiled about an axis on to the layer of binder material such that the coils become at least partially submerged in the layer of binder material with the axes of the coils parallel to a major surface of the backing material; and
   c) curing the binder material to produce a coated abrasive.

6. A process according to claim 5 in which coated abrasive is subjected to a dressing operation until the portions of the abrasive coils furthest from the backing are exposed and removed, to expose a dressed surface in which are exposed two end pieces for each turn of each coil that is cut away by the dressing operation.

7. A process according to claim 5 in which the filamentary abrasive grits are formed from a sol-gel alumina.

8. A process according to claim 5 in which the filamentary abrasive grits are formed from a seeded sol-gel alumina.

9. A process according to claim 5 in which the space within the abrasive coils is at least partially occupied by a composition comprising a grinding adjuvant.

* * * * *